(12) United States Patent
Bustany et al.

(10) Patent No.: US 11,645,440 B1
(45) Date of Patent: May 9, 2023

(54) MACHINE LEARNING BASED DELAY ESTIMATION

(71) Applicant: Xilinx, Inc., San Jose, CA (US)

(72) Inventors: Ismail Bustany, San Carlos, CA (US); Yifan Zhou, Fremont, CA (US)

(73) Assignee: XILINX, INC., San Jose, CA (US)

( * ) Notice: Subject to any disclaimer, the term of this patent is extended or adjusted under 35 U.S.C. 154(b) by 427 days.

(21) Appl. No.: 17/062,324

(22) Filed: Oct. 2, 2020

(51) Int. Cl.
*G06F 30/3312* (2020.01)
*G06F 30/398* (2020.01)
*G06N 20/00* (2019.01)
*G06N 5/04* (2023.01)
*G06F 30/394* (2020.01)
*G06F 30/392* (2020.01)
*G06F 30/33* (2020.01)
*G06F 30/3315* (2020.01)
*G06F 111/06* (2020.01)

(52) U.S. Cl.
CPC .......... *G06F 30/3312* (2020.01); *G06F 30/33* (2020.01); *G06F 30/392* (2020.01); *G06F 30/394* (2020.01); *G06F 30/398* (2020.01); *G06N 5/04* (2013.01); *G06N 20/00* (2019.01); *G06F 30/3315* (2020.01); *G06F 2111/06* (2020.01)

(58) Field of Classification Search
CPC .................................................. G06F 30/3312
USPC ......................................................... 716/113
See application file for complete search history.

(56) References Cited

U.S. PATENT DOCUMENTS

| 10,608,901 B2 | 3/2020 | Tayal et al. |
| 10,678,973 B2 | 6/2020 | Chuang et al. |
| 2019/0325092 A1* | 10/2019 | Ren .................. G06N 3/082 |

OTHER PUBLICATIONS

Kapre, InTime: A Machine Learning Approach for Efficient Selection of FPGA CAD Tool Parameters, FPGA '15, ACM 978-1-4503-3315-3/15/02.
Min Xu and Fadi J. Kurdahi, Area and Timing Estimation for Lookup Table Based FPGAs, University of California, Irvine, CA, 1066-1409/96, copyrite 1996.
Jingjing Guo, Peng Cao, Zhaohao Sun, Bingqian Xu, Zhiyuan Liu and Jun Yang, Novel Prediction Framework for Path Delay Variation Based on Learning Method, Electonics 2020, MDPI, Jan. 15, 2020.
Taraneh Taghavi, Soheil Ghiasi, Abhishek Ranjan, Salil Raje, Majid Sarrafzadeh, Innovate or Perish: FPGA Physical Design, ISPD '04, Apr. 18-21, 2004, Phoenix, Arizona, USA, Copyright 2004.

(Continued)

*Primary Examiner* — Eric D Lee
(74) *Attorney, Agent, or Firm* — Crawford Maunu PLLC

(57) ABSTRACT

Training of a machine learning model used to infer estimated delays of circuit routes during placement and routing of a circuit design. Training can include selecting sample pairs of source pins and destination pins of an integrated circuit (IC) device, and determining respective delays of shortest paths that connect the source pins to the destination pins of the sample pairs based on a resistance-capacitance model of wires that form the shortest paths on the IC device. Respective sets of features are determined for the shortest paths, and the model is trained using the respective sets of features and the respective delays as labels. The machine learning model can be provided to an electronic design automation tool for estimating delays.

20 Claims, 8 Drawing Sheets

(56) References Cited

OTHER PUBLICATIONS

Anshuman Nayak, Malay Haldar, Alok Choudhary, and Prith Banerjee, Accurate Area and Delay Estimators for FPGAs, AccelChip, Inc, www.AccelChip.com, and Northwestern University, Evanston, IL 60208.

Valavan Manohararajah, Gordon R. Chiu, Deshanand P. Singh, and Stephen D. Brown, Predicting Interconnect Delay for Physical Synthesis in a FPGA CAD Flow, Altera Toronto Technology Center, vmanohar/gchiu/dsingh/sbrown@altera.com.

U.S. Appl. No. 16/397,501, filed Apr. 29, 2019, entitled: Automated Analysis and Optimization of Circuit Designs. The Examiner is referred to the copending patent prosecution of the common Applicant (no attachment).

\* cited by examiner

|   | interconnect tile column (j) | | | | | |
|---|---|---|---|---|---|---|
|   | 0 | 1 | 2 | ... | n-2 | n-1 |
| 0 | H:{T1, T2, T3, ...}<br>V:{T1, T2, T3, ...} | H:{T1, T2, T3, ...}<br>V:{T1, T2, T3, ...} | H:{T1, T2, T3, ...}<br>V:{T1, T2, T3, ...} | ... | H:{T1, T2, T3, ...}<br>V:{T1, T2, T3, ...} | H:{T1, T2, T3, ...}<br>V:{T1, T2, T3, ...} |
| 1 | H:{T1, T2, T3, ...}<br>V:{T1, T2, T3, ...} | H:{T1, T2, T3, ...}<br>V:{T1, T2, T3, ...} | H:{T1, T2, T3, ...}<br>V:{T1, T2, T3, ...} | ... | H:{T1, T2, T3, ...}<br>V:{T1, T2, T3, ...} | H:{T1, T2, T3, ...}<br>V:{T1, T2, T3, ...} |
| 2 | H:{T1, T2, T3, ...}<br>V:{T1, T2, T3, ...} | H:{T1, T2, T3, ...}<br>V:{T1, T2, T3, ...} | H:{T1, T2, T3, ...}<br>V:{T1, T2, T3, ...} | ... | H:{T1, T2, T3, ...}<br>V:{T1, T2, T3, ...} | H:{T1, T2, T3, ...}<br>V:{T1, T2, T3, ...} |
| ... | ... | ... | ... | ... | ... | ... |
| m-2 | H:{T1, T2, T3, ...}<br>V:{T1, T2, T3, ...} | H:{T1, T2, T3, ...}<br>V:{T1, T2, T3, ...} | H:{T1, T2, T3, ...}<br>V:{T1, T2, T3, ...} | ... | H:{T1, T2, T3, ...}<br>V:{T1, T2, T3, ...} | H:{T1, T2, T3, ...}<br>V:{T1, T2, T3, ...} |
| m-1 | H:{T1, T2, T3, ...}<br>V:{T1, T2, T3, ...} | H:{T1, T2, T3, ...}<br>V:{T1, T2, T3, ...} | H:{T1, T2, T3, ...}<br>V:{T1, T2, T3, ...} | ... | H:{T1, T2, T3, ...}<br>V:{T1, T2, T3, ...} | H:{T1, T2, T3, ...}<br>V:{T1, T2, T3, ...} | interconnect tile row (i)

MACHINE LEARNING BASED DELAY ESTIMATION

TECHNICAL FIELD

The disclosure generally relates to estimating delays of signal paths in a pre-routed circuit design.

BACKGROUND

In order to achieve timing closure for a circuit design targeted at an integrated circuit (IC) device, signal delays are estimated at various stages of the design flow. For example, delays are estimated during macro placement, global placement, detailed placement, physical synthesis, and initial routing of the circuit design. The estimated delays can be used to place elements of the circuit design at sites and generate signal routes that are more likely to satisfy timing constraints.

Current approaches for estimating delays involve resistance-capacitance delay models of wire resources of a target device. The existing models produce generally accurate delay estimates for short paths. However, delay estimates of longer paths and paths at device and input/output boundaries can be highly inaccurate. Inaccurate delay estimates can result in placements that make finding a routing solution that does not violate timing constraints difficult and time consuming.

The accuracy of current approaches could be improved by more detailed modeling of more possible paths of the target device. However, such an approach would require substantially more memory and computing resources to implement. Also, considerable effort and computing resources would be required to generate a detailed model for each different device family.

SUMMARY

A disclosed method includes configuring a computer system with a training program to create a machine learning model. Execution of the training program causes the computer system to select sample pairs of source pins and destination pins of an integrated circuit (IC) device. The training program causes the computer system to determine respective delays of shortest paths that connect the source pins to the destination pins of the sample pairs based on a resistance-capacitance model of wires that form the shortest paths on the IC device, and determine a respective set of features of each of the shortest paths. The supervised machine learning model is trained using the respective sets of features and the respective delays as labels, and the machine learning model is provided an electronic design automation tool for estimating delays of paths between source pins and destination pins of a circuit design on the IC device and for generating logic placement and signal routes for making an integrated circuit that implements the circuit design.

Another disclosed method includes instantiating a supervised machine learning model that computes estimated delays between source pins and destination pins of an integrated circuit (IC) device based on features of shortest paths between the source pins and destination pins. The method inputs a circuit design to an electronic design automation (EDA) tool executing on a computer system. The circuit design specifies a plurality of connections between elements of the circuit design. The method includes determining for each connection of the plurality of connections in placing the connection on the IC device, an estimated delay from a source pin of the IC device to a destination pin of the IC device. The determining of the estimated delay includes determining a set of features of a shortest path from the source pin to the destination pin and determining the estimated delay by the machine learning model in response to input of the set of features to the machine learning model. The method includes placing each connection on a source pin of the IC device and on a destination pin of the IC device by the EDA tool based on the estimated delay, and routing placed connections of the circuit design by the EDA tool. The method includes generating implementation data based on the placing and routing for making an integrated circuit that implements the circuit design.

A disclosed system includes one or more processors and a memory arrangement configured with instructions of a training program that when executed by the one or more processors cause the one or more processors to perform operations including selecting sample pairs of source pins and destination pins of an integrated circuit (IC) device. Execution of the instructions causes the one or more processors to determine respective delays of shortest paths that connect the source pins to the destination pins of the sample pairs based on a resistance-capacitance model of wires that form the shortest paths on the IC device, and to determine a respective set of features of each of the shortest paths. Execution of the instructions causes the one or more processors to train a machine learning model using the respective sets of features and the respective delays as labels. Execution of the instructions causes the one or more processors to configure an electronic design automation tool to use the machine learning model to estimate delays of paths between source pins and destination pins of a circuit design on the IC device and to generate logic placement and signal routes for making an integrated circuit that implements the circuit design.

Other features will be recognized from consideration of the Detailed Description and Claims, which follow.

BRIEF DESCRIPTION OF THE DRAWINGS

Various aspects and features of the disclosed methods and systems will become apparent upon review of the following detailed description and upon reference to the drawings in which:

FIG. 5 shows a tile crossing type cache;

DETAILED DESCRIPTION

Figure 1:
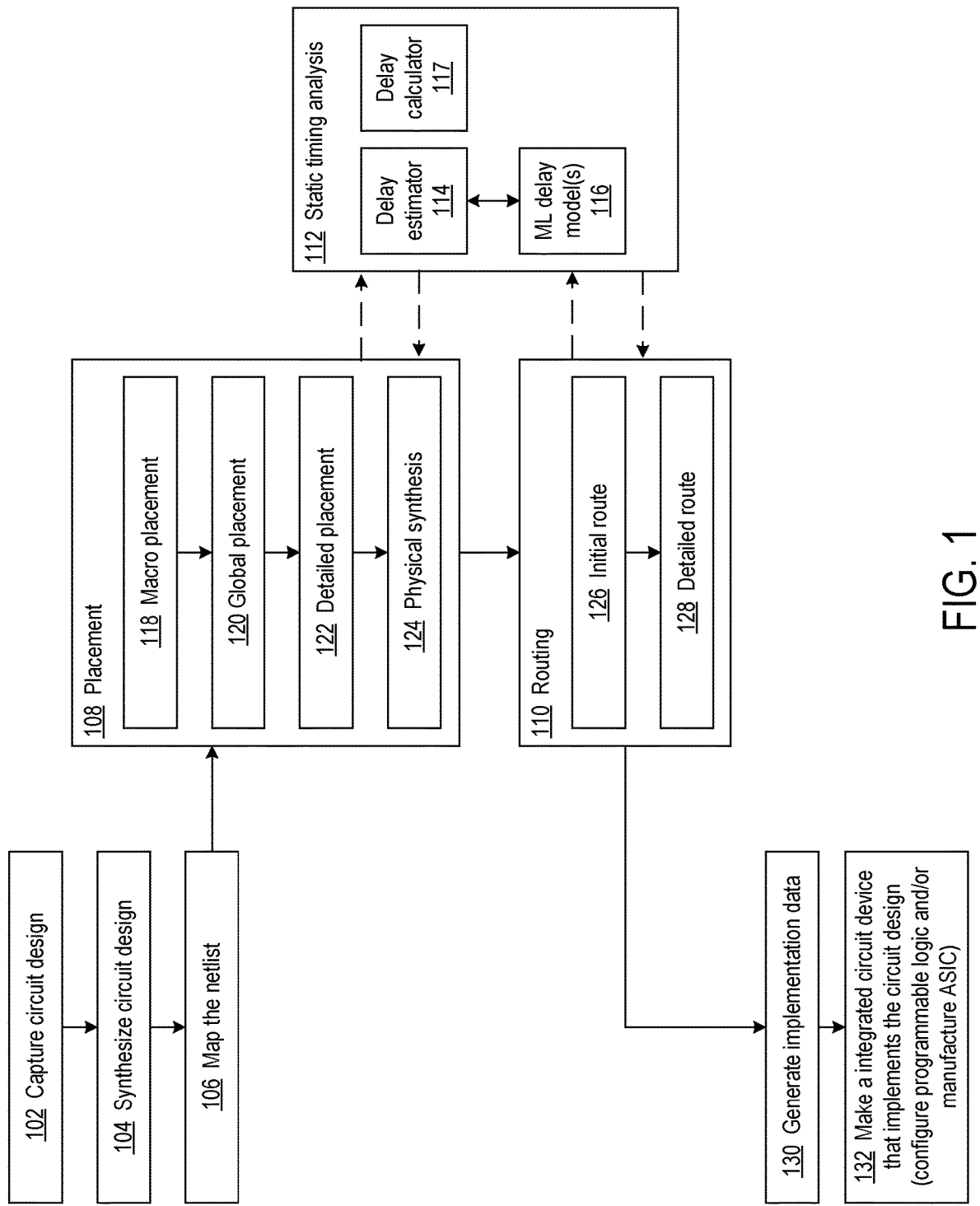
FIG. 1 shows an exemplary design flow for creating a circuit from a circuit design, using a machine learning model to estimate delays during placement and initial routing.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Current approaches for estimating delays of pin-to-pin interconnects during place-and-route of a circuit design can produce inaccurate delays, which can lead to timing violations in a placed and routed circuit design. Resolving timing violations can involve repeated place and route procedures and add to use of computer resources. The disclosed approaches produce more accurate delay estimates than prior approaches. Improved accuracy of delay estimates produce placements on which signal routes can be generated with fewer difficulties in satisfying timing constraints. The disclosed approaches reduce computer resources needed in an EDA design flow as less processing is needed to route circuit designs and satisfy timing constraints.

Current approaches for estimating interconnect delay are based on lumped RC wire delay models, and one exemplary approach uses a baseline "in-box" model to estimate delays. The baseline in-box model has precomputed delays for paths within a small area (the "in-box") of the IC die. In estimating the delay between a source pin and a destination pin on the IC die, the distance between the two pins is compared to the distance of the longest path within the in-box. If the distance between the two pins is less than or equal to the longest path, the estimated delay is the precomputed delay for the path of equal length in the in-box.

For a path having a length that is greater than that of the longest path within the in-box, the path is divided into a long segment and a short segment. The short segment has a length that is less than or equal to the length of the longest path within the in-box, and the long segment is the remainder of the path after subtracting the short segment. The estimated delay of the path is the estimated delay of the long segment plus the estimated delay of the short segment. The estimated delay of the short segment can be determined from the delays of paths in the baseline in-box model. The delay of the long segment can be determined from horizontal and vertical long routing wires on the device. A long routing wire spans multiple tiles of circuitry in an array of tiles, for example. The delay of a long segment can be estimated based on a shortest path that includes a horizontal long routing wire and a vertical long routing wire. The shortest path starts with a horizontal long routing wire that extends from the source pin to a point on the horizontal long routing wire that is within range of the bounds on the X axis of the in-box containing the destination pin. The vertical long routing wire used for the shortest path extends from the endpoint of the horizontal long routing wire to a point on the vertical long routing wire is with range of the bounds on they Y axis of the in-box containing the destination pin. The estimated delay of the long segment is the sum of the known delays of the horizontal and vertical long routing wires.

For short paths, that is for paths having lengths less than or equal to the longest path of the in-box, the estimated delays are sufficiently accurate. However, for long paths and (short/long) paths that are near input/output circuits and device boundaries, the accuracy of the estimates is notably lower. For example, in some devices only 65% of the queried pin-to-pin interconnects have a delay error less than 5%, which can be problematic for estimating critical paths and achieving timing closure. Thus, any path having a length greater than the paths of the in-box or near the device boundary can have a large error in the estimated delay.

The accuracy of estimated delays for long paths could be improved by increasing the size of the in-box. However, computational and memory requirements for a much larger number of paths increase dramatically. For example, for some families of programmable ICs having rows and columns of tiles of circuitry (e.g., UltraScale+ and Versal device families from XILINX, Inc.), a smaller in-box can cover 20 columns and 26 rows, and the number of paths is very large (64(LOGIC_OUT)*146(IMUX_IN)*20(cols)*26(rows)*4(quads)=19,435,520 paths). A larger in-box would greatly compound the number of paths.

The disclosed approaches employ machine learning (ML) models to estimate delays between pins on an IC device for un-routed paths of a circuit design. The ML models can provide greater accuracy than prior approaches, because the ML models can capture nonlinear delay characteristics better than traditional modeling approaches. Thus, the disclosed approaches can reduce the computer resources consumed to provide accurate delay estimates and achieve timing closure.

A supervised learning approach is used to train the ML model. According to one application involving programmable ICs, such as field programmable gate arrays (FPGAs) or other devices having programmable routing circuitry, the ML model can be trained using features of the IC and programmable routing circuitry associated with pin-to-pin interconnects of the IC. The labels used in training can be determined based on previously computed delays that describe the programmable routing circuitry on a chosen path from the source pin to the destination pin. Examples of features for an FPGA can include crossing types of interconnect tiles over which the path crosses ("tile crossing types"), distances between pins, and types of the source and destination pins.

The disclosed approaches can be adapted to estimating path delays on application specific integrated circuits (ASICs). For example, instead of features that include interconnect tile types, the features can include input/output pin types, gate distances, net fanout, and RC values of routing layers for stages of the physical design methodology where long wires are assumed to be buffered. Labels can be generated by selecting random pairs of pins, routing the pairs with a shortest path algorithm, and determining delays using known delay information. The model can then be trained accordingly.

According to the disclosed approaches for training an ML model to estimate pin-to-pin delays for an IC device, a training program selects sample pairs of source pins and destination pins of an integrated circuit (IC) device. The selected pairs are a representative subset of all possible pin-to-pin connections of various lengths. The training program determines the shortest path that connects each pair of pins, and the shortest path is used in determining the delay. A resistance-capacitance (RC) model of wire segments of the device can be used to determine each delay, which is used as the label in training. The training program determines respective sets of features of the paths and uses the sets of features and delays to train the ML model. Once the ML model is trained, the ML model can be configured for use by an electronic design automation (EDA) tool. In performing place-and-route processes on a circuit design, the EDA tool can call upon the ML model to estimate delays of paths between source pins and destination pins for generating logic placement and signal routes of an integrated circuit that implements the circuit design.

According to the disclosed approaches for using an ML model to estimate delays by an EDA tool during place-and-route processes, the EDA tool instantiates a trained ML model (as described above) in memory of a computer system. The EDA tool inputs a circuit design, and the circuit design specifies connections between elements (i.e., drivers of signals and sinks of signals) of the circuit design. During the placing of each connection on a target IC device, the EDA tool determines an estimated delay from a source pin of the IC device to a destination pin of the IC device for various paths in the circuit design.

In determining an estimated delay of a pin-to-pin connection, the EDA tool determines a set of features of a shortest path from the source pin to the destination pin. The EDA tool inputs the set of features to the ML model, which determines the estimated delay. Based on the estimated delays of the paths, the EDA tool places the connections on selected source and destination pins of the IC device and routes the path based on the placed connections. Place-and-route processes can be iterative if performance constraints (e.g., timing, area, and power) are not achieved. Once all design constraints are satisfied, the EDA tool can generate implementation data for making an integrated circuit based on the placed and routed design.

FIG. 1 shows an exemplary design flow for creating a circuit from a circuit design, using a machine learning model to estimate delays during placement and initial routing. The design flow can be supported by electronic design automation tools, such as the Vivado® design tool from XILNIX, Inc. At block 102, the design tool inputs a circuit design, such as through a hardware description language or a graphical user interface having user-selectable and configurable function blocks. The circuit design specifies connections between elements (sources and sinks of signals) of the circuit design. The circuit design can be synthesized at block 104 to produce a netlist, and at block 106 the netlist can be mapped to circuit structures that are available on a target IC device.

At blocks 108 and 110, the netlist can be placed and routed. The place-and-route phases of the design flow are the phases in which the disclosed approaches for estimating pin-to-pin interconnect delays by an ML model can be used. Each of the placement and routing phases can call upon the static timing module 112 to provide estimated delays of pin placements and signal routes under consideration. The placement phase can include macro placement 118, global placement 120, detailed placement 122, and physical synthesis phases as known in the art. The routing phase can include an initial route phase 126 and a detailed route phase 128, as known in the art. Each of the phases of placement 108 can call on the static timing module to provide estimated delays for most or all of the connections of the circuit design. The initial routing phase 126 of routing 110 calls on the delay estimator of static timing analysis 112 to estimate path delays using ML delay model(s) 116. The detailed routing phase 128 calls on the delay calculator 117 of static timing analysis to determine delays of paths based on actual routes.

The delay estimator 114 uses the ML model 116 to determine estimated delays of pin-to-pin connections in response to requests from the placement and routing phases 108 and 110. In response to being presented with a source pin and a destination pin of the target IC device from the placement and routing phases 108 and 110, the delay estimator determines a shortest path between the pins, and then determines the features associated with that shortest path. For a target IC device that uses programmable interconnect circuitry to connect source to destination pins, the features can include numbers and types of tiles over which the path crosses, distances between pins, and types of the source and destination pins. The delay estimator inputs the set of features to the ML delay model 116, and the ML delay model returns an estimated delay. The delay estimator returns the estimated delay to the calling one of the placement or routing phases, and the placement/routing phase places the pin or routes the signals based on the estimated delay.

At block 130, the design tool generates implementation data from the placed-and-routed circuit design. The implementation data can be suitable for configuring programmable logic and routing resources of an FPGA or suitable for fabricating an ASIC. At block 132, an IC device can be made based on the implementation data. The IC device can be made by configuring a programmable IC with configuration data or fabricating an ASIC.

Figure 2:
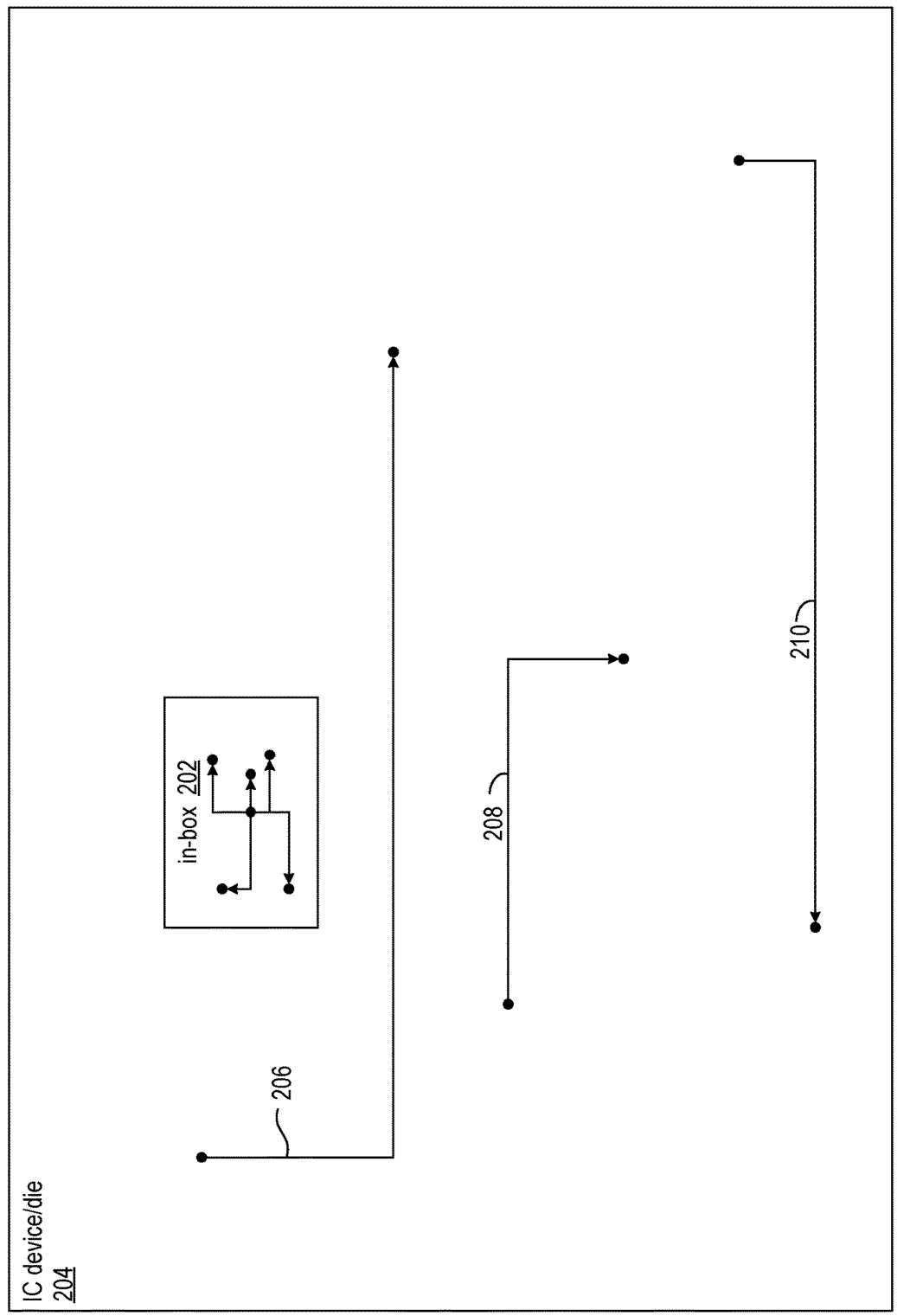
FIG. 2 shows signal routes (or "paths") between source pins and destination pins on an integrated circuit device.

FIG. 2 shows signal routes (or "paths") between source pins and destination pins on an integrated circuit device. As indicated above, current approaches for estimating a delay between a source pin and a destination pin involve an in-box model. The example of FIG. 2 shows in-box 202, which encompasses a portion of the IC device. The in-box model specifies estimated delays for all paths from a source pin at the center of the box (or a pin near the center) to all destination pins within the in-box. Each path is the shortest route (by Manhattan distance) from the source pin to the destination pin, and the estimated delay is based on lumped RC wire delay models of the IC device.

Previous approaches can be inaccurate for estimating delays of paths having lengths that are greater than lengths of paths within the in-box. For example, paths 206, 208, and 210 have lengths greater than paths of the in-box and can be referred to as "long paths." In estimating the delay of a long path, a previous approach splits the path into two segments. The delay of the shorter of the segments can be estimated using the in-box model, and the delay of the longer of the segments is estimated as described above.

The disclosed approaches can improve the accuracy of estimated delays through use of an ML model, according to one of three exemplary alternative approaches. The three approaches include a hybrid model, a universal model, and a dual region model. The hybrid model has an ML model trained by features of a sample set of paths that are longer than the paths of the in-box, and the baseline in-box delay model having precomputed delays for paths covered by the in-box. The hybrid model estimates delays of paths that are longer than paths in the in-box using the ML model and estimates delays of paths that are covered by the in-box using the baseline in-box model.

The universal model has an ML model that is trained by features of a sample set of paths having lengths that range from lengths of in-box paths to lengths of paths longer than in-box paths. The universal model provides accurate delay estimates for both in-box paths and long paths. However, the large number of samples required to cover all regions of the device imposes longer a training time. The universal approach does not require the in-box model, which can be advantageous when training the model for new devices. This larger number of samples can be mitigated to some extent, by treating the in-box sampled data as a minority class and weighting the ML regressor's corresponding gradients accordingly.

The dual region model has two ML models. One model is trained by features of in-box paths, and the other model is trained by features of long paths. The two ML models can be trained using feature sets of fewer samples than the universal model and still provide sufficient accuracy for both long paths and paths that covered by the in-box. Fewer samples are required for the dual region model than for the universal model, because sampling of data can be restricted to only in-box and only out-box areas. In the universal model, large numbers of samples are needed in both areas.

Figure 3:
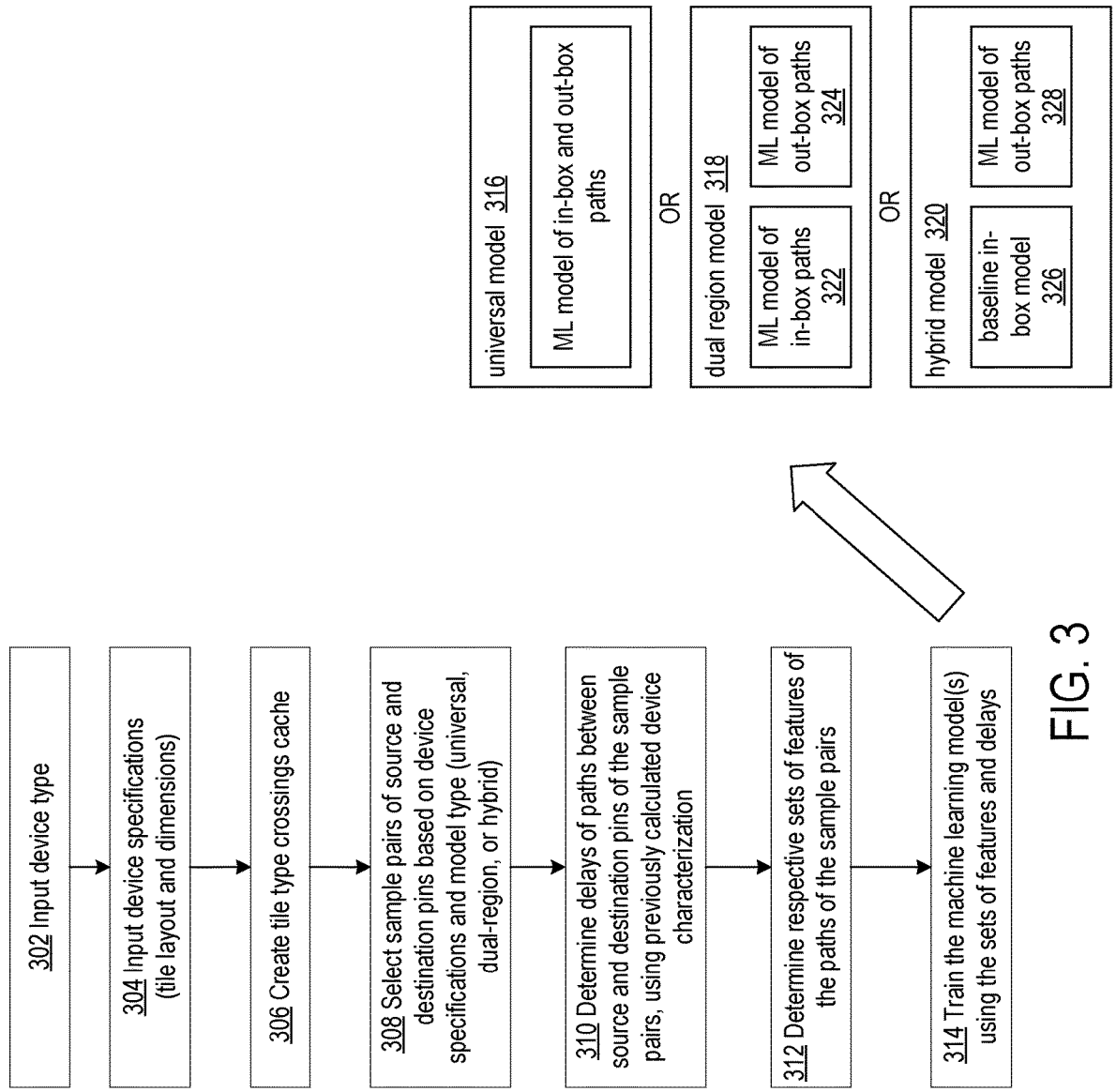
FIG. 3 shows a flowchart of an exemplary process for training a machine learning model that estimates delays of signal paths on an IC device.

FIG. 3 shows a flowchart of an exemplary process for training a machine learning model that estimates delays of signal paths on an IC device. A computer system can be configured to execute a training program that creates and trains the ML model(s) according to the process of FIG. 3. Different models can be created for different families of IC devices. Different models can also be generated for different speeds of devices within a family of devices.

At block 302 the training program inputs data indicative of the type device. At block 304, based on the device type, the process inputs specifications of the device, such as a tile layout for an FPGA. At block 306, the process creates an interconnect tile crossing type cache in order to reduce the compute time required to determine the feature set of a path, both in training and in inference. As there can be tens or hundreds of millions of queries for delay estimates in processing a circuit design, reducing the time required to extract the feature set of a path can significantly improve performance.

The interconnect tile crossing type cache is a two-dimensional matrix (e.g., FIG. 5) that is indexed by positions of interconnect tiles on the IC device, and each entry in the matrix has two lists of counts of interconnect tile crossing types. One list has counts of interconnect tile crossing types from leftmost edge of the device, and the other list has counts of interconnect tile crossing types from the topmost edge of the device. Thus, a feature set that specifies counts of interconnect tile crossing types from a source pin to a destination pin can be determined from the two entries in the tile crossings cache for interconnect tiles associated with the source and destination pins.

Interconnect tiles of an FPGA have programmable routing circuitry that can be configured to carry signals on the device. Each source pin is associated with an interconnect tile to which the source pin can be connected to send a signal, and each destination pin is associated with an interconnect tile to which the destination pin can be connected to receive a signal. The crossing type of an interconnect tile can be the type of logic gate to which the interconnect tile connects. For example, in XILINX FPGAs interconnect tiles can connect to standard cell logic (e.g., lookup tables and flip-flops), digital signal processors (DSPs), block RAMs (BRAMs), ultra RAMs (URAMs), inter-die connection circuitry, etc. The crossing type of an interconnect tile can be standard logic, DSP, BRAM, URAM, or inter-die connection, for example.

At block 308 the process selects sample pairs of source and destination pins based on the device specifications and desired type of ML model. As indicated above, the ML model can be a universal model 316, a dual region model 318, or a hybrid model 320. The dual region model or hybrid model can be used to mitigate overemphasis on long paths by the universal model and a uniform distribution of path lengths.

For the selected model, the sample pairs are selected at random according to a uniform distribution of lengths. For the universal model 316, the lengths of the sample pairs are uniformly distributed in length from shortest path possible within the in-box to the longest path possible on the device.

For the dual region model 318, two sets of sample pairs are selected: one set for the long paths (or "out-box" paths) and one set for the in-box paths. Recognizing that a very large percentage of queries by the placement and routing phases will involve paths of lengths covered by the in-box, the number of sample pairs selected to train the ML model of in-box paths 322 can be weighted to emphasize training for in-box paths. For example, the number of sample pairs selected to train the ML model of in-box paths 322 can approach the number of sample pairs selected to train the ML model of out-box paths 324, even though a far greater number of out-box paths are possible given the much larger device area outside the in-box. The sample pairs selected for training the ML model of in-box paths 322 are selected at random according to a uniform distribution of lengths of paths covered by the in-box. The sample pairs selected for training the ML model of out-box paths 324 are selected at random according to a uniform distribution of lengths of paths longer than paths covered by the in-box.

For the hybrid model 320, a baseline model of in-box paths 326 can be used for paths having lengths covered by the in-box, and an ML model of out-box paths 328 can be trained with and used for estimating delays of paths having lengths greater than the in-box paths. The baseline in-box-model 326 is not an ML model and need not be trained. The baseline model is based on lumped RC wire delay models and has precomputed delays for paths covered by the in-box as described previously. The sample pairs selected for training the ML model of out-box paths 328 are selected at random according to a uniform distribution of lengths of paths longer than paths covered by the baseline in-box model 326.

At block 310, the process determines delays of paths that connect the sample pairs of source and destination pins. The path for each pair can determined by an initial router function as a path that includes one horizontal segment and one vertical segment, in order to be compatible with the features of paths described by the interconnect tile crossing type cache. The delay of a path can be computed using lumped RC wire models for segments of wire that comprise the path between the source and destination pins. The computed delay for a path is used as the label for training the ML model.

At block 312, the process determines respective sets of features of the paths. The features of a path can include counts of interconnect tile crossing types on the path, the Manhattan distance from the source pin to the destination pin, and types of the source and destination pins. The types of the source and destination pins can be the type of logic gate to which they are connected. For example, on an FPGA the types of the source and destination pins can those that carry data signals to and from lookup tables, flip-flops, DSPs, BRAMs, URAMs, etc. The features on each path can be determined from device description files that specify the device layout and features.

According to one approach, some type of tiles can be categorized by an alias of a single type. An aliasing map can be used to determine which tile types are aliased. Types of tiles that have the same delay characteristics can be recognized as a single type as identified by the alias. The use of aliases can greatly reduce the number of features used to characterize paths on the device and thereby reduce processing time. Also, interconnect tiles through which routing is not allowed are not included in the feature set.

At block 314, the process trains the ML model using the feature sets and labels. An exemplary approach uses the Anaconda training platform and methods of gradient boosting trees (GBTs) such as XGBoost and LightGBM. The inference platform can be implemented using C++ API's for XGBoost and LightGBM. To further speedup inference and provide cross-platform compatibility, the trained GBT models are converted into a serializable protocol buffer ("protobuf") formatted models. Then, during inference, an in-memory predictor reads in the protobuf formatted models and creates a runtime GBT model. Alternative ML types of models can include random forest, multilayer perception (MLP), support vector machine (SVM), and deep neural network (DNN). GBTs have been found to provide suitable accuracy and runtime profiles. Given that the delay estimation problem is highly nonlinear, GBT's are a good fit for this problem as long as the tendency to overfit is tamed by tuning various parameter settings.

Figure 4:
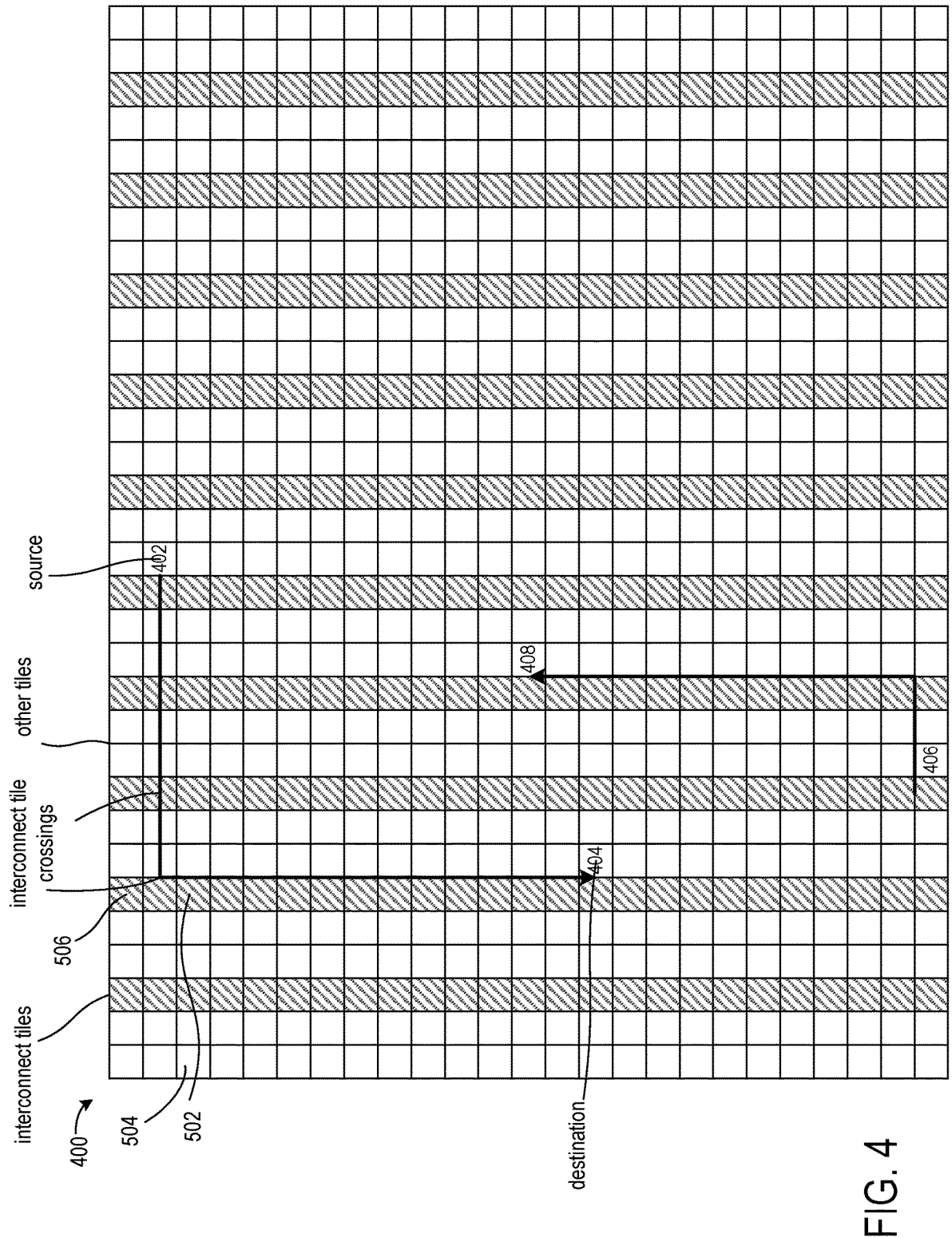
FIG. 4 shows an exemplary IC device, a layout of different types of tiles of circuitry on the device, and paths connecting source pins to destination pins.

FIG. 4 shows an exemplary IC device 400, a layout of different types of tiles of circuitry on the device, and paths connecting source pins to destination pins. The features set for a given pin pair includes a list of interconnect tile crossing types. The interconnect tile crossing types are the crossing types on a shortest path from source pin to destination pin. The shortest path that is used in the disclosed approaches is a Manhattan path having one segment that spans horizontally from the source pin, followed by another segment that spans vertically to the destination pin. The feature set of the path includes the numbers of tile types along the path, along with the types of the source and destination pins and the length of the path.

Interconnect tiles are shown as blocks filled with diagonal line, and other types of tiles are shown as white-filled blocks. The other types of tiles can include configurable logic blocks, block RAM blocks, input/output blocks, and digital signal processing (DSP) blocks. The tiles can be arranged in an array, and for purposes of determining feature sets, the interconnect tiles can be indexed by row ("i" index) and column ("j" index).

Two exemplary pairs of source and destination pins are shown. One pin-pair includes source 402 and destination 404, and the other pin-pair includes source 406 and destination 408. The path from source 402 to destination 404 includes a horizontal segment and a vertical segment, and 17 interconnect tiles are crossed by the segments. The path from source 406 to destination 408 includes a horizontal segment and a vertical segment, and the count of interconnect tile crossings is 14. The counts of interconnect tile crossing types depends on the types of tiles the interconnect tiles connect to, as explained above.

FIG. 5 shows a tile type crossing cache 500. The tile type crossing cache can be a table constructed in memory that is accessible to the training program (FIG. 2), and later instantiated in another memory that is accessible to the delay estimator 114 (FIG. 1). For each interconnect tile on the device, the training program pre-calculates a list of numbers of interconnect tile crossing types from the left-most tile in the same row as the tile and a list of numbers of interconnect tile crossing types from the top-most tile in the same column as the tile. The pairs of lists are stored in a two-dimensional matrix indexed row and column of each interconnect tile on the device.

The entry for each interconnect (the interconnect tile at row i, column j of the device) includes two lists. The first list, which is denoted H{ } in the table, contains for each type of tile, the number of tiles of that type from the leftmost tile in row i to the tile$_{i,j}$. The second list, which is denoted V{ } in the table, contains for each type of tile, the number of tiles of that type from the topmost tile in column j to the tile$_{i,j}$. The numbers of the different tile types are denoted Tn, where n indicates one of the possible tile types. For example, interconnect tile 502 in FIG. 4 can be indexed by interconnect row 2, interconnect column 1. The H-list of the entry in cache 500 would include tile type counts from tile 504 in row 2, and the V-list of the entry would include tile type counts from tile 506 in column 1.

To further speedup inference, the tile type counts of a feature set can be determined from the pre-calculated numbers of interconnect tile crossing types in the lists of the source pin and the destination pin. The numbers of tile types on the horizontal segment of the path from the source to the destination can be determined from the differences in counts in the H{ } lists of the source and destination, the numbers of tile types on the vertical segment of the path can be determined from differences in counts in the V{ } lists, and the total numbers of interconnect tile crossing types can be determined by summing the differences.

For example, to compute the numbers of interconnect tile crossing types from a source interconnect tile (S) at i1, j1, to a destination interconnect tile (D) at i2, j2, the H{ } and V{ } lists are obtained for both interconnect tiles.

Using the counts in the H{ } lists, the numbers of interconnect tile crossing types crossings on the horizontal segment are the absolute differences between the interconnect tile crossing types in the lists: abs(Hs{T1}-H$_D${T1}), abs(Hs{T2}-H$_D${T2}), . . . , abs(Hs{Tm}-H$_D${Tm}), for m types of tile crossings. Similarly, using the counts in the V{ } lists, the numbers of interconnect tile crossing types on the vertical segment are abs(Vs{T1}-V$_D${T1}), abs(Vs{T2}-V$_D${T2}), . . . , abs(Vs{Tm}-V$_D${Tm}). The number of interconnect tile crossing types for a tile type on the path from the source to the destination is the sum of the absolute differences computed for the horizontal and vertical segments (e.g., abs(Hs{T1}-H$_D${T1})+abs(Vs{T1}-V$_D${T1})). The counts of interconnect tile crossing types of the left-most and top-most interconnect tile would be 0.

Figure 6:
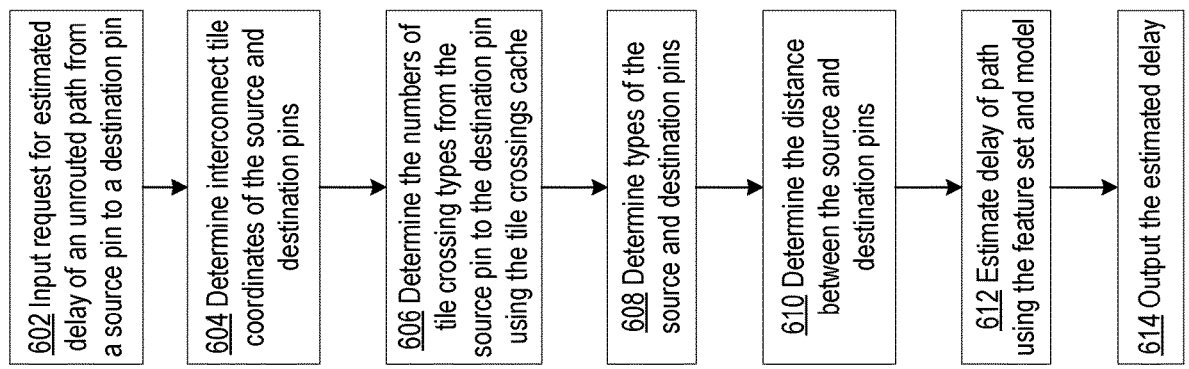
FIG. 6 shows a flowchart of an exemplary process of estimating delay between a source pin and a destination pin on an IC device.

FIG. 6 shows a flowchart of an exemplary process of estimating delay between a source pin and a destination pin on an IC device. A computer system can be configured to execute a delay estimator and inference program that estimate delays between pairs of source and destination pins based on an ML model(s).

At block 602, the process inputs a request to estimate the delay on a path from a source pin to a destination pin for an un-routed path of a circuit design. The request can be input from placement and/or routing phases of a circuit design flow.

At block 604, the process determines the coordinates of the interconnect tiles associated with the source and destination pins. Based on the coordinates of the interconnect tiles, at block 606 the process determines the numbers of interconnect tile crossing types from the source pin to the destination pin using the tile crossings cache 500, as described above.

At block 608, the process determines the types of the source and destination pins from the specifications of the device. The process determines the path length as the distance from the source pin to the destination pin at block 610. The distance can be a Manhattan distance determined based on a device specification that indicates x-y coordinates of the pins and a known scale of coordinates to distance.

At block 612, the process estimates the delay using the ML model. In an embodiment involving the hybrid model 320 (FIG. 3), if the path length is less than or equal to the longest path in the in-box, the estimated delay is obtained from the baseline in-box model 326 (FIG. 3). If the path length is greater than the longest path in the in-box, the feature set is input to the ML model 328 (FIG. 3) to obtain the estimated delay.

In an embodiment involving the universal model 316 (FIG. 3), the feature set is input to the ML model 316 to obtain the estimated delay.

In an embodiment involving the dual region model 318 (FIG. 3), the process selects either the ML model 322 or the ML model 324 based on the path length. If the path length is less than or equal to the longest path of the in-box, the feature set is input to the ML model of in-box paths 322 to obtain the estimated delay. Otherwise, the feature set is input to the ML model of out-box paths 324 to obtain the estimated delay.

At block 614, the process outputs the estimated delay, such as by returning the value to the placement or routing phases of the design flow.

Figure 7:
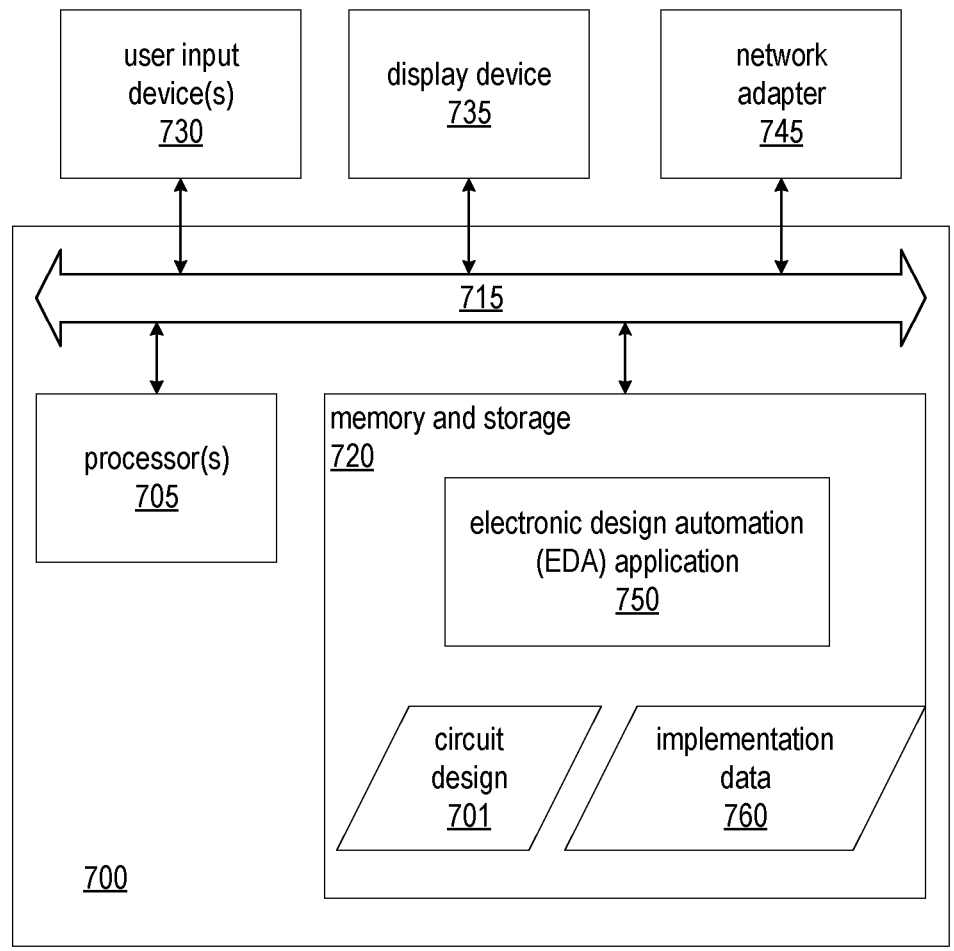
FIG. 7 is a block diagram illustrating an exemplary data processing system.

FIG. 7 is a block diagram illustrating an exemplary data processing system (system) 700. System 700 is an example of an EDA system. As pictured, system 700 includes at least one processor circuit (or "processor"), e.g., a central processing unit (CPU) 705 coupled to memory and storage arrangement 720 through a system bus 715 or other suitable circuitry. System 700 stores program code and circuit design 701 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid-state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750. EDA application 750, being implemented in the form of executable program code, is executed by processor(s) 705. As such, EDA application 750 is considered part of system 700. System 700, while executing EDA application 750, receives and operates on circuit design 701. In one aspect, system 700 performs a design flow on circuit design 701, and the design flow may include synthesis, mapping, placement, routing, and the estimation of delays according to the disclosed methods and systems. System 700 generates implementation data 760 for creating a circuit according to the functions specified by circuit design 701. A computer system such as system 700 can also be configured with a training program to train a machine learning model according to the disclosed methods.

EDA application 750, circuit design 100, circuit design 760, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Figure 8:
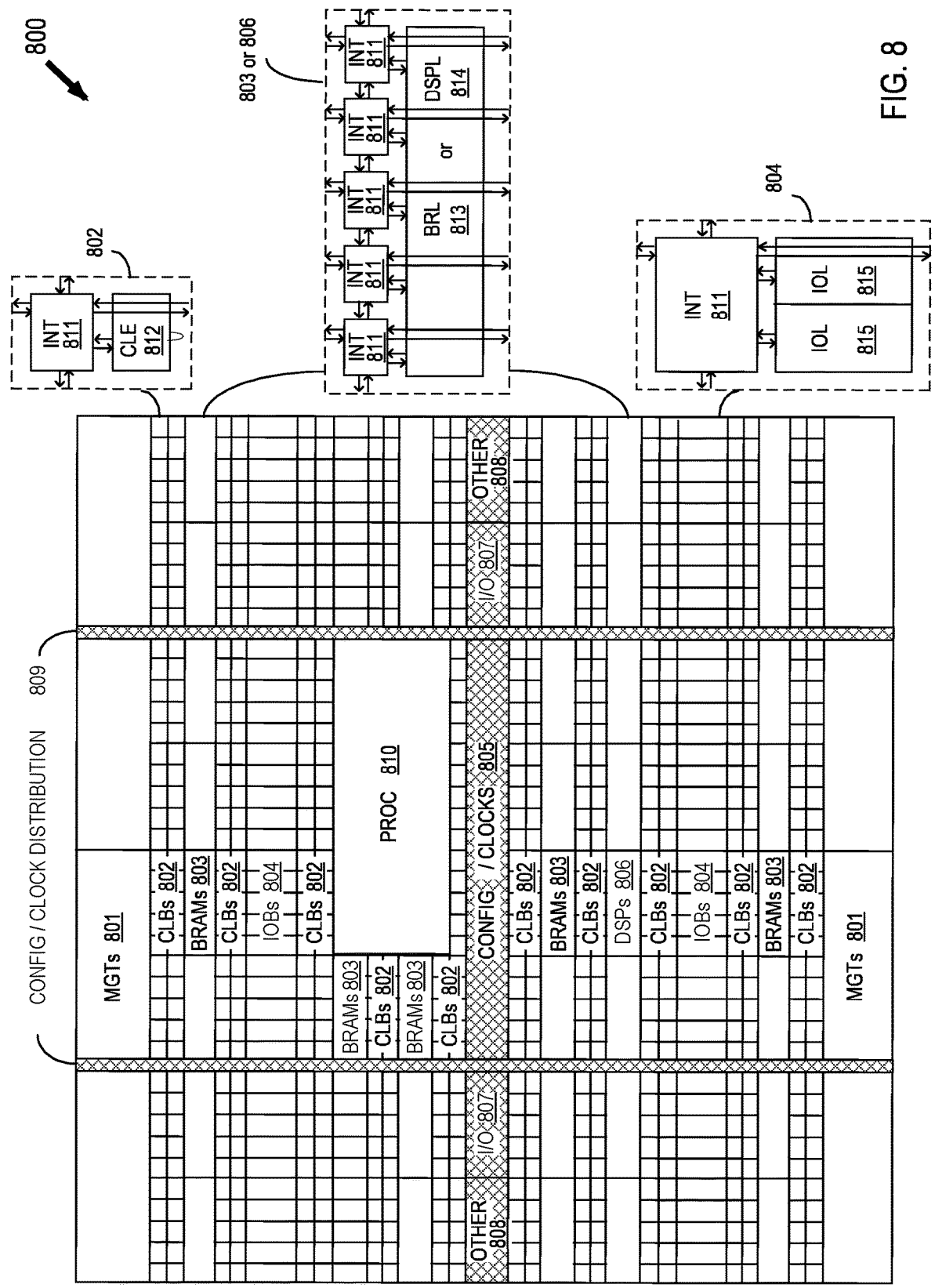
FIG. 8 shows a programmable integrated circuit (IC) for which pin-to-pin delays can be estimated according to the disclosed approaches.

FIG. 8 shows a programmable integrated circuit (IC) 800 for which pin-to-pin delays can be estimated according to the disclosed approaches. The programmable IC may also be referred to as a System On Chip (SOC) that includes field programmable gate array logic (FPGA) along with other programmable resources. FPGA logic may include several different types of programmable logic blocks in the array. For example, FIG. 8 illustrates programmable IC 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some programmable IC having FPGA logic also include dedicated processor blocks (PROC) 810 and internal and external reconfiguration ports (not shown). Circuit designs processed according to the disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA logic. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 806 can include a DSP logic element (DSPL) 814 in addition to an appropriate number of programmable interconnect elements. An 10B 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

A columnar area near the center of the die (shown shaded in FIG. 8) is used for configuration, clock, and other control logic. Horizontal areas 809 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 8 include additional logic blocks that disrupt the regular columnar structure making up a large part of the programmable IC. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for estimating pin-to-pin delays of un-routed paths of a circuit design. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
    configuring a computer system with a training program to create a machine learning model, wherein execution of the training program causes the computer system to perform operations including:
        selecting sample pairs of source pins and destination pins of an integrated circuit (IC) device;
        determining respective delays of shortest paths that connect the source pins to the destination pins of the sample pairs based on a resistance-capacitance model of wires that form the shortest paths on the IC device;
        determining a respective set of features of each of the shortest paths;
        training the machine learning model using the respective sets of features and the respective delays as labels; and
        providing the machine learning model to an electronic design automation (EDA) tool for estimating delays of paths between source pins and destination pins of a circuit design on the IC device and for generating logic placement and signal routes for making an integrated circuit that implements the circuit design.

2. The method of claim 1, wherein each respective set of features includes types of tiles of the IC device crossed by the shortest path.

3. The method of claim 2, wherein each respective set of features includes counts of the types of tiles of the IC device crossed by the shortest path.

4. The method of claim 1, wherein each respective set of features includes a distance between the source pin and the destination pin of one of the sample pairs.

5. The method of claim 1, wherein each respective set of features includes a pin type of the source pin of the sample pair.

6. The method of claim 1, wherein each respective set of features includes a pin type of the destination pin of the sample pair.

7. The method of claim 1, wherein the selecting of the sample pairs includes selecting the sample pairs based on a uniform distribution of lengths of the shortest paths of the sample pairs.

8. The method of claim 1, wherein the selecting of the sample pairs includes selecting pairs having lengths of the shortest paths that are greater than a threshold.

9. The method of claim 1, wherein:
    the selecting of the sample pairs includes:
        selecting first pairs having lengths of the shortest paths that are less than a threshold and based on a uniform distribution of lengths of the shortest paths of the first pairs,
        selecting second pairs having lengths of the shortest paths that are greater than the threshold and based on a uniform distribution of lengths of the shortest paths of the second pairs;
    the training of the machine learning model includes:
        training a first machine learning model using the respective sets of features of the shortest paths of the first pairs and the respective delays as labels, and
        training a second machine learning model using the respective sets of features of the shortest paths of the second pairs and the respective delays as labels; and
    the providing includes providing the first machine learning model and the second machine learning model to the EDA tool.

10. A method, comprising:
    instantiating a machine learning model that computes estimated delays between source pins and destination pins of an integrated circuit (IC) device based on features of shortest paths between the source pins and destination pins;
    inputting a circuit design to an electronic design automation (EDA) tool executing on a computer system, wherein the circuit design specifies a plurality of connections between elements of the circuit design;
    determining for each connection of the plurality of connections in placing the connection on the IC device, an estimated delay from a source pin of the IC device to a destination pin of the IC device, wherein the determining of the estimated delay includes:
        determining a set of features of a shortest path from the source pin to the destination pin, and
        determining the estimated delay by the machine learning model in response to input of the set of features to the machine learning model;

placing each connection on a source pin of the IC device and on a destination pin of the IC device by the EDA tool based on the estimated delay;

routing placed connections of the circuit design by the EDA tool; and generating implementation data based on the placing and routing for making an integrated circuit that implements the circuit design.

11. The method of claim 10 wherein:

the IC device includes a plurality of tiles of different types arranged in an array; and the features include counts of the different types of the plurality of tiles;

the instantiating the machine learning model includes instantiating a table indexed by row and column coordinates from two edges of the IC device, and each entry in the table having counts of the types of tiles from the two edges;

the determining the set of features includes:

looking up in the table a first entry at row-column coordinates associated with the source pin and a second entry at row-column coordinates associated with the destination pin; and determining the set of features from the counts of the types of tiles from the two edges in the first entry and the counts of the types of tiles from the two edges in the second entry.

12. The method of claim 10, further comprising making an integrated circuit based on the implementation data to implement the circuit design on the integrated circuit.

13. The method of claim 10, wherein the instantiating includes reading from memory a serialized protocol buffer that specifies the machine learning model, and creating the machine learning model.

14. A system comprising:

one or more processors;

a memory arrangement configured with instructions of a training program that when executed by the one or more processors cause the one or more processors to perform operations including:

selecting sample pairs of source pins and destination pins of an integrated circuit (IC) device;

determining respective delays of shortest paths that connect the source pins to the destination pins of the sample pairs based on a resistance-capacitance model of wires that form the shortest paths on the IC device;

determining a respective set of features of each of the shortest paths;

training a machine learning model using the respective sets of features and the respective delays as labels; and configuring an electronic design automation (EDA) tool to use the machine learning model to estimate delays of paths between source pins and destination pins of a circuit design on the IC device and to generate logic placement and signal routes for making an integrated circuit that implements the circuit design.

15. The system of claim 14, wherein each respective set of features includes types of tiles of the IC device crossed by the shortest path.

16. The system of claim 14, wherein each respective set of features includes a distance between the source pin and the destination pin of one of the sample pairs.

17. The system of claim 14, wherein each respective set of features includes a pin type of the source pin of the sample pair.

18. The system of claim 14, wherein each respective set of features includes a pin type of the destination pin of the sample pair.

19. The system of claim 14, wherein the instructions for selecting of the sample pairs include instructions for selecting the sample pairs based on a uniform distribution of lengths of the shortest paths of the sample pairs.

20. The system of claim 14, wherein:

the instructions for selecting of the sample pairs include instructions for:

selecting first pairs having lengths of the shortest paths that are less than a threshold and based on a uniform distribution of lengths of the shortest paths of the first pairs, selecting second pairs having lengths of the shortest paths that are greater than the threshold and based on a uniform distribution of lengths of the shortest paths of the second pairs;

the training of the machine learning model includes:

training a first machine learning model using the respective sets of features of the shortest paths of the first pairs and the respective delays as labels, and training a second machine learning model using the respective sets of features of the shortest paths of the second pairs and the respective delays as labels; and the instructions for configuring the EDA tool to use the machine learning model include instructions for configuring the EDA tool to use the first machine learning model and the second machine learning model.

* * * * *